Patented Mar. 30, 1954

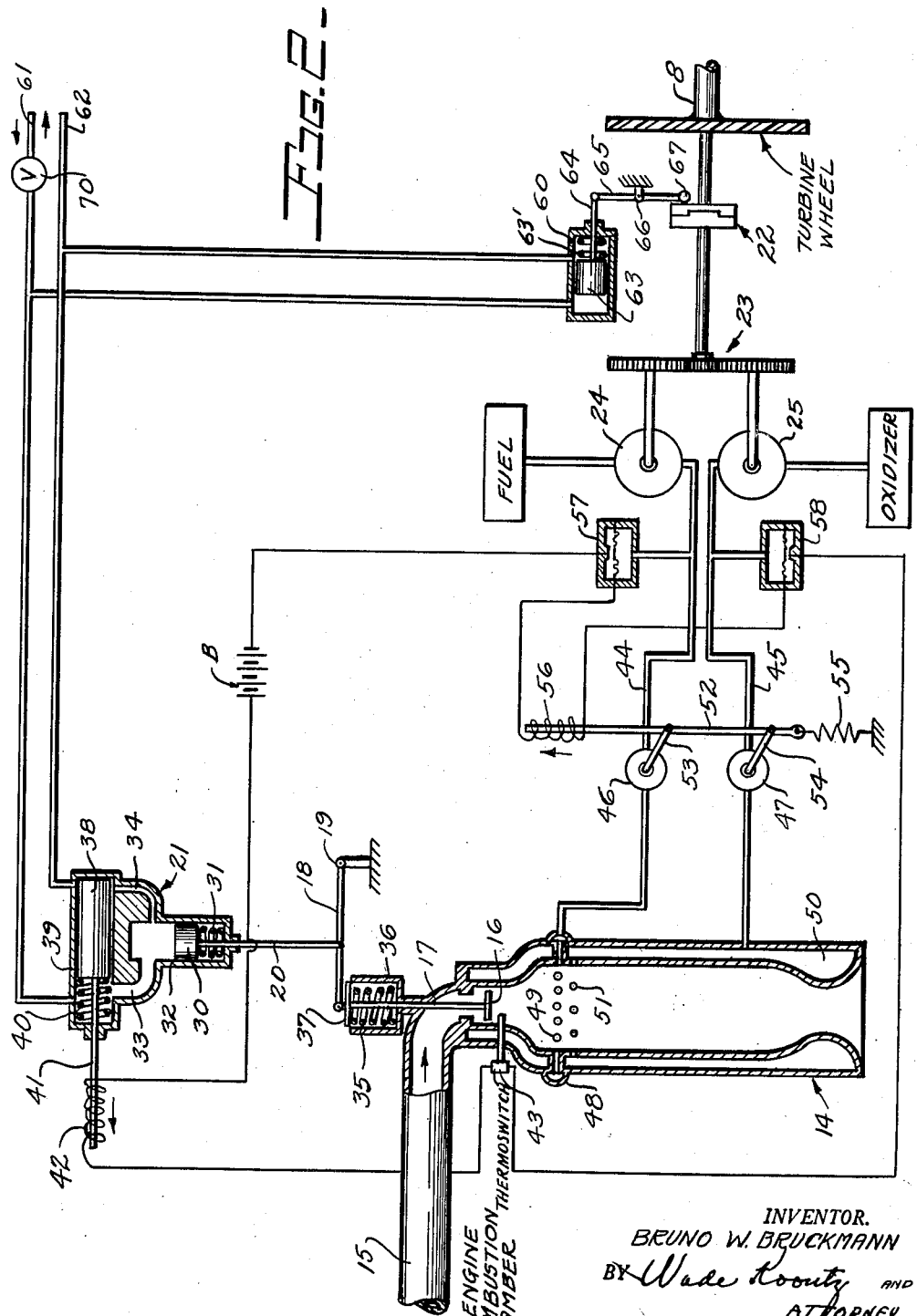

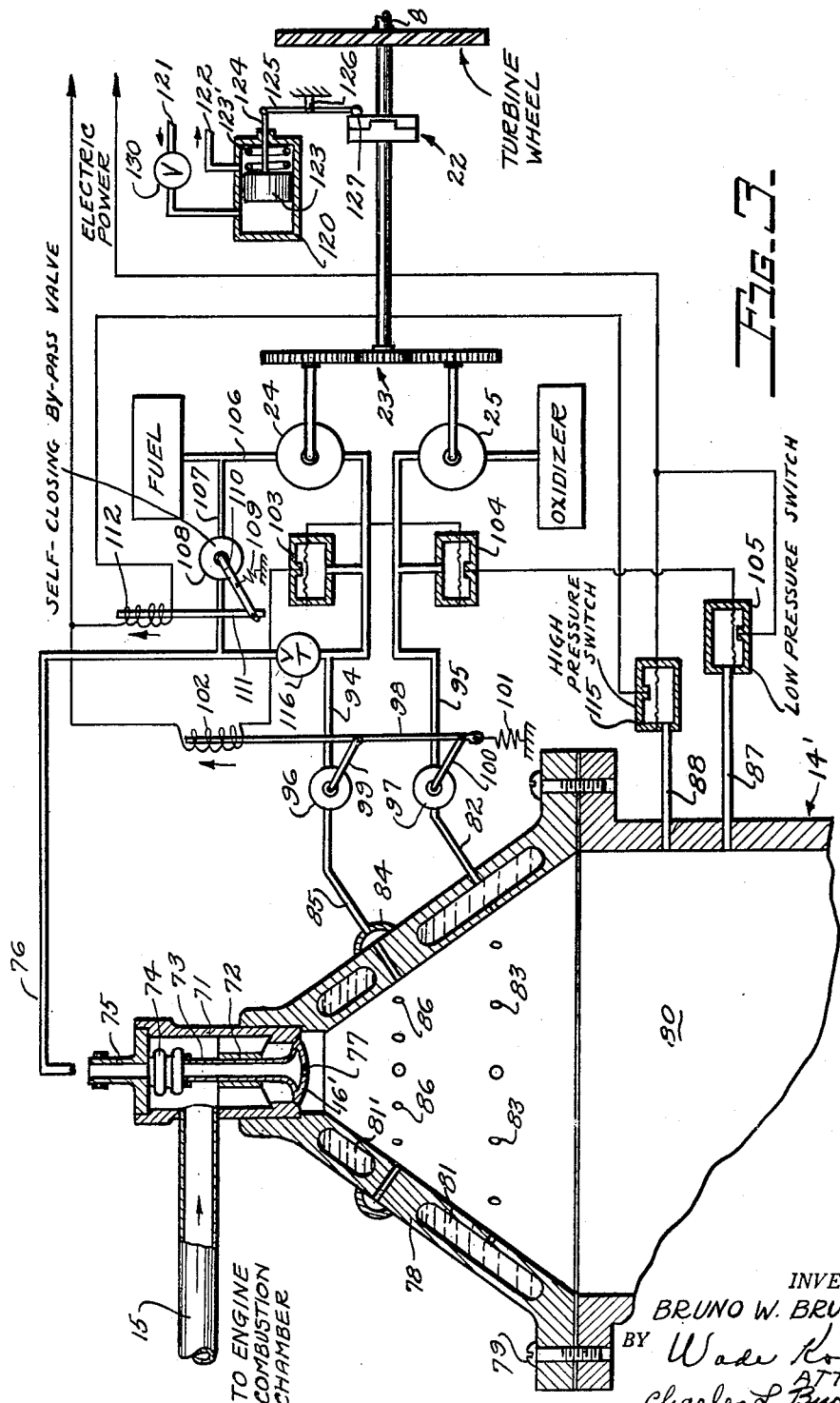

2,673,445

UNITED STATES PATENT OFFICE 2,673,445

TURBOJET AND ROCKET MOTOR COMBINATION WITH HOT GAS IGNITION SYSTEM FOR NONSELF-REACTION ROCKET FUELS

Bruno W. Bruckmann, Greene County, Ohio, assignor to United States of America as represented by the Secretary of the Air Force Application June 21, 1949, Serial No. 100,521

6 Claims. (Cl. 60—35.6)

(Granted under Title 35, U. S. Code (1952), sec. 266)

The invention described herein may be manufactured and used by or for the United States Government for governmental purposes without payment to me of any royalty thereon.

The present invention relates to an aircraft propulsion unit in the form of a turbojet and rocket motor combination with hot gas ignition system for non-selfreacting rocket fuels.

The primary object of the invention is to provide a turbojet aircraft engine having a rocket motor mounted within the central conical portion of the exhaust nozzle of the engine, thus utilizing to good advantage space which might otherwise be wasted.

A further object of the invention is to provide a turbojet aircraft engine having a rocket motor mounted within the central conical portion of the exhaust nozzle of the engine and including means to divert some of the high temperature combustion products from the engine to the rocket motor for initiating a chemical reaction in the rocket motor, which reaction involves the use of nonselfreacting fuels or reactants.

Another object of the invention is to provide a turbojet aircraft engine having a rocket motor fixed in the exhaust section of the engine and including a mechanical coupling between the engine turbine and the pumping units for the rocket motor.

Another object of the invention is to provide a turbojet and rocket motor combination including a control system for the rocket motor whereby hot gas diverted from the turbojet combustion chamber is supplied to the rocket motor only long enough to start the rocket oxidation reaction and is then shut off automatically to prevent loss of efficiency and thrust in the turbojet engine and to prevent rocket oxidation products from flowing into the turbojet combustion chamber.

Another object of the invention is to provide a turbojet engine having a built-in thrust-augmenting unit occupying the central portion of the engine exhaust section.

Another object of the invention is to provide a turbojet and rocket motor combination including a control system for the rocket motor requiring a minimum of attention by the aircraft pilot or flight engineer.

Another object of the invention is to provide a rocket motor for use on aircraft and including a control system having certain automatic features which make the motor particularly useful on aircraft.

The above and other objects of the invention will become apparent upon reading the following detailed description of the invention in conjunction with the accompanying drawings, in which:

Fig. 2 is a diagrammatic view of a control system for the rocket motor and showing the motor in some detail.

Fig. 3 is a diagrammatic view of a second control system for the rocket motor and showing a second form of motor in some detail.

Figure 1:
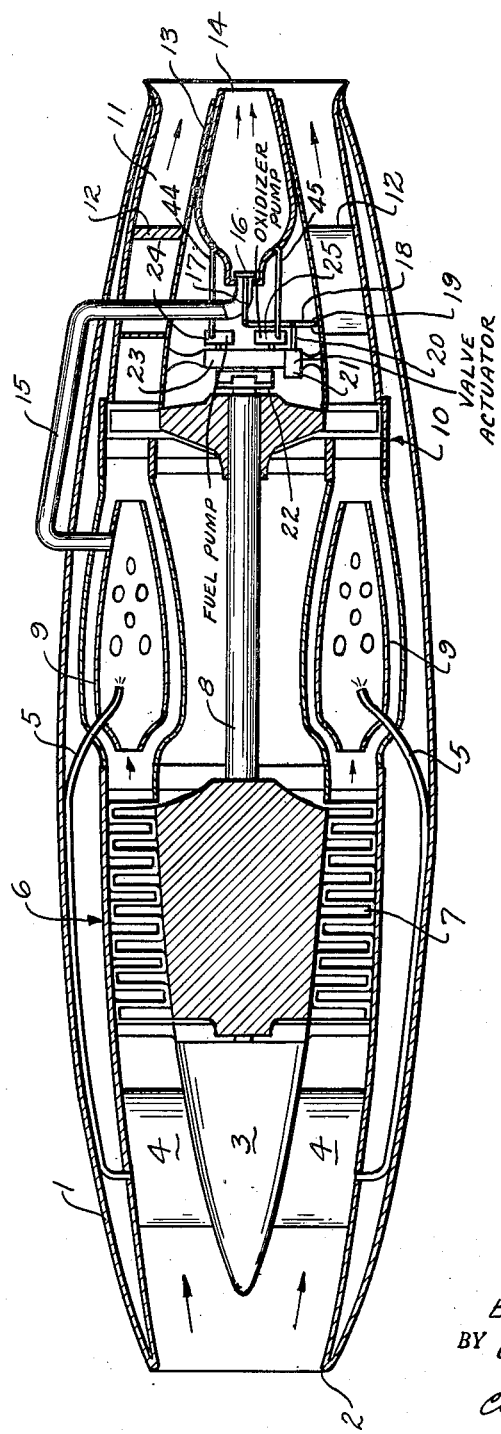
Fig. 1 is a logitudinal cross sectional view taken through a typical turbojet engine and including a rocket motor mounted on the central axis of the engine in the exhaust section thereof.

The preferred embodiment of the invention is best illustrated by reference to Fig. 1, showing a turbojet engine in longitudinal cross section. The engine proper comprises a double-walled housing 1 of circular cross sectional shape open at the forward end to provide an air intake 2. The air entering the housing passes around the accessory housing 3, also called the island. The housing 3 and parts therewithin are supported by two or more struts 4 of hollow section, through which pass various control wires and conduits such as the fuel lines 5. The air after passing housing 3 is compressed by an air compressor 6 having rotor elements 7 turning with the engine main shaft 8. The compressed air flows into the combustion chambers 9 arranged around the engine, where it supports combustion of the engine fuel flowing from the fuel lines 5. The products of combustion plus some excess air flow through the gas turbine 10 to cause rapid rotation of the turbine, main shaft and compressor rotor. The hot exhaust gases then flow freely through the annular exhaust nozzle 11 and are discharged into the atmosphere rearwardly thereof. The propulsive effect of the turbojet engine is due to the large increase in volume of gases in the combustion chamber due to burning of fuel and rapid rise in temperature of the gaseous products of combustion. Thus the engine receives considerably less volume of air per unit of time than is discharged, since the exhaust products are at very much higher temperatures than the incoming air.

On the central axis of the engine and supported by hollow struts 12 there is a tapered housing 13 within which is mounted a rocket motor 14, discharging rearwardly in a manner similar to the turbojet engine. Since the rocket fuels selected may not be of the self-reacting type, a hot gas diversion pipe 15 is provided to carry heated gases from one of the combustion chambers 9 to the rocket motor 14. The hot gas so diverted flows into the rocket motor chamber through the small forward end thereof, which is provided with the starting valve 16 slidably mounted by means of a rigid stem 17. The stem is pivoted to a lever 18 which is in turn pivoted at 19 to a fixed bracket. The lever 18 is actuated by a rod 20 connected to an actuator 21. Connected by a clutch 22 to the main shaft 8 there is a gear reduction unit 23 driving the fuel pump 24 and the oxidizer pump 25. The two pumps feed fuel and oxidizer to the rocket motor by way of fuel lines, whereby a violent reaction takes place in the motor chamber involving rapid oxidation of fuel and outward flow of large volumes of gaseous rocket propellants. The fuel used may be kerosene as used also in the turbojet engine and the oxidizer may be concentrated nitric acid ($HNO_3$). The oxidizing reaction therebetween is not self-starting and as a result hot gas flow from the engine must be relied on to bring the temperature in the rocket chamber up to or above approximately 250° C. Then when the fuel and oxidizer are started flowing into the chamber a reaction is started which is rather complex but which does result in rapid oxidation of the hydrocarbon fuel (kerosene) with the evolution of heat. The volumes of gaseous oxidation products flow rapidly from the motor 14 to give greatly increased thrust on the combination turbojet engine and rocket motor. Preferably the rocket motor is only maintained in operation for short time periods, such as during take off of the aircraft or during climb maneuvers. Furthermore after the reaction is started in the rocket chamber, the valve 16 must be closed to prevent flow of high pressure gases from the rocket chamber to the combustion chamber 9. As will be explained below this valve closing action is preferably made automatic, in response to increase in the temperature or pressure within the rocket chamber.

Referring now to Fig. 2 there is shown one form of control system for the rocket motor and also some details of the motor itself. The motor 14 receives hot gases from the turbojet engine by way of the conduit 15 and poppet valve 16, the gases entering at the end of the motor chamber remote from the open discharge end thereof. The valve 16 includes a rigid valve stem or guide member 17 extending to a lever 18 which is pivoted at 19 to a fixed support. The lever is actuated by a rod 20 extending into a special hydraulic actuating unit 21 and connected therein to a piston 30. The piston 30 is movable in one direction to close poppet valve 16 by means of a spring 31 and is movable in the opposite direction to open poppet valve 16 by action of hydraulic fluid flowing into cylinder 32 by way of side passage 33. Closing of the valve 16 is accomplished by closing the passage 33 and opening a small caliber fluid return passage 34 to permit the spring 31 to move the piston 30 toward the outlet end of the cylinder 32. The slow rate of closing of valve 16 as fluid passes through the return passage 34 will allow the reaction between the fuel and oxidizer to become well started before the flow of hot gases to the reaction chamber is cut off. The closing action of the valve 16 is further assisted by another coil spring 35 mounted in a housing 36 and bearing on a disk 37 secured to the valve stem 17. Control over the fluid supply to cylinder 32 is provided for by a slide valve 38 slidably mounted in a cylinder 39 of the control unit 21. The valve member 38 is adapted to close off either of the passages 33 or 34, and is retained in the position shown by a compression spring 40 surrounding the rod or stem 41 extending outwardly for actuation in the direction of the arrow by means of a solenoid 42. Thus the solenoid is adapted to move the valve 38 to a position closing the fluid supply passage 33 and opening the fluid return passage 34, upon actuation of the solenoid by an electrical circuit including a source of electrical potential B and three switches to be described. One of these switches indicated at 43 is responsive to an elevated temperature corresponding to the temperature required to start the rocket reaction, the switch closing at such elevated temperature. As shown the switch 43 has a portion fitting inside the reaction chamber near the hot gas inlet. Numerous kinds of temperature responsive switches may be used but for purposes of illustration reference is made to the U. S. Patent No. 2,373,857 to N. J. Smith for a detailed showing of a reliable and sensitive switch suitable for use in this installation.

The fuel and oxidizer supply system for the rocket motor includes a clutch 22 for applying engine power to a reduction gear 23 through which power is applied to the fuel pump 24 and to the oxidizer pump 25. The fuel and oxidizer under pressure flow by way of conduits 44 and 45 to the rocket motor through the valves 46 and 47. Fuel may flow into an annular manifold 48 around the motor 14 and thence through numerous apertures or nozzles 49 into the rocket chamber. Oxidizer may flow into the annular cavity 50 extending throughout the length of the motor 14 and thence through numerous apertures or nozzles 51 into the rocket chamber. The valves 46 and 47 are normally retained in closed position by means of a link 52 connected to the valve actuating arms 53 and 54, the spring 55 exerting a constant pull on the link to retain it in the valve "off" position. The valves are moved to open position by means of a solenoid 56 acting on one end of link 52 to move the link in the direction of the arrow. The solenoid 56 is in series with the battery B, switches 43, 57 and 58 as well as solenoid 42. The switches 57 and 58 are responsive to fuel and oxidizer pressures respectively to close and perform their part in closing the power circuit to solenoids 42 and 56. These pressure switches or pressurestats ensure that the supply valves 46 and 47 will not open until there is pressure on the fuel and oxidizer and also ensure that the hot gas valve 16 will not close until the fuel and oxidizer are ready to flow into the reaction chamber of the rocket motor. As illustrated in Fig. 2 these pressure switches may each comprise a small fluid receiving chamber covered on one side by a diaphragm which will bulge under pressure to close an electrical circuit. It should be noted also that the annular chamber 50 in the rocket motor extends throughout the length of the reaction chamber, so that the oxidizer will be preheated and the chamber walls will be cooled slightly at the same time. In order to actuate the clutch 22 to the driving condition thereof, a hydraulic actuating cylinder 60 is connected to the pressure and return line 61 and 62 which also supply the valve actuating unit 21. In the cylinder 60 there is slidably mounted a piston 63 which carries a piston rod 64, the latter in turn being pivoted to a lever 65 mounted on a fixed pivot 66. The other end 67 of the lever 65 is adapted to force the clutch plates together and provide a driving connection from the engine shaft 8 to the gear reduction unit 23.

The operation of the control system is very simple, since as will be seen the system may be placed in operation by turning on the control valve 70 to start the servo-fluid flowing in pressure line 61. The fluid will flow to cylinder 39 of valve actuating unit 21 and thence by way of passage 33 to cylinder 32. The piston 30 will then be forced outwardly to the position shown and the hot gas valve 16 will be opened accordingly. Assuming that the turbojet engine is running in normal manner, the hot gas diverted along conduit 15 will begin heating up the rocket motor very rapidly. At the same time the unit 21 is actuated by pressure in line 61, the fluid pressure will also actuate the piston 63 to apply power to the fuel-oxidizer supply system. Since the pumps 24 and 25 will now start operating the pressure switches 57 and 58 will close. After the temperature responsive switch 43 closes in response to a rise in temperature in the rocket chamber, the circuit will be completed to the solenoids 42 and 56. Immediately the fuel and oxidizer valves 46 and 47 will be opened and the piston 39 of servo-unit 21 will close the passage 33 and open the passage 34. The fuel and oxidizer will now flow into the reaction chamber where hot gas is still flowing by way of valve 16. The high temperature reaction between the fuel (kerosene) and oxidizer (HNO₃) will start immediately and will maintain itself in operation due to the heat generated by the reaction. Oxidation of the kerosene or other fuel occurs by combining with the oxygen in the oxidizer, the heat being required to start decomposition of the oxidizer into its components for release of the oxygen into an available form. The oxygen so obtained is in a nascent state and thus provides a more active oxidizing agent than if furnished from an ordinary gas storage tank or from air. The reaction thus proceeds with the evolution of heat and gaseous products of oxidization. The reaction products represent a tremendous increase in volume over the liquids entering the chamber by nozzles 49 and 51, so that the motor provides a large thrust as the reaction products blow out of the open end of the reaction chamber. After the rocket motor has been in operation long enough to perform its required thrust augmenting function, the manual valve 70 is shut off. This causes the clutch servo-unit to be de-energized and power is thus disconnected from the fuel and oxidizer pumps. It is noted that any fluid ahead of the piston 63 when the valve 70 is closed will be displaced by action of spring 63′ and by leakage past the piston 63 this fluid will gradually escape to the fluid return line connected to the right-hand end of the cylinder 60. The pressure switches 57 and 58 then open to de-energize the solenoids 42 and 56. The valves 46 and 47 then close under action of the spring 55, and the valve 38 returns to the position shown under action of the spring 40. The valve 16 being already closed, no further action will occur with respect to this element and parts connected thereto. The positions of the parts as illustrated corresponds to a condition wherein the valve 70 has just been turned on, but the circuit including switches 43, 57 and 58 and solenoids 42 and 56 has not yet been closed by the automatic means associated therewith.

Referring now to Fig. 3 there is shown a second or alternate form of control system for the rocket motor and also some details of a slightly different rocket motor. The motor 14′, of which only the forward end is shown, receives hot gases from the turbojet engine by way of the conduit 15 and poppet valve 16′. The conduit opens into a combined valve chamber and gas inlet chamber 71 within which is mounted a central valve guide 72 to slidably mount the hollow valve stem 73. The valve stem connects by an actuating bellows 74 to a fitting 75 adapted to receive liquid fuel under pressure from the line 76. The valve 16′ has a small fuel aperture 77 in the mushroom head thereof to inject some fuel as soon as the valve opens by reason of pressure applied to the actuating bellows 74. The bellows has one end secured directly to the hollow valve stem and the other end secured to a stationary part on the fitting 75, so that when the fuel in the line 76 is put under pressure the bellows will expand lengthwise and move the poppet valve 16′ to open position. When the pressure is released the bellows will have enough resiliency to collapse and again close the valve 16′. If desired an assist spring may be associated with the valve stem to ensure closing of the valve 16′ when the pressure in line 76 is relieved. Such a spring would be similar in function to the spring 35 of Fig. 2.

The rocket motor further includes a tapering forward end portion 78 connected by bolts 79 to a cylinder 80 open at the end which is not shown and preferably tapering slightly, as shown in Fig. 1, to better fit the space available in the exhaust section of the engine. The end portion 78 is provided with interconnecting annular recesses 81 and 81′ through which circulates liquid oxidizing agent flowing in from the pipe 82. A row of nozzles or apertures 83 permits oxidizer to flow into the reaction chamber. An annular exterior manifold 84 integral with the wall of portion 78 receives liquid fuel from pipe 85, while a row of nozzles 86 carries the fuel from the manifold into the reaction chamber. Extending into the reaction chamber are pressure sensing tubes 87 and 88 leading to a low pressure and a high pressure switch respectively.

The fuel and oxidizer supply system for the rocket motor 14′ includes a clutch 22 for applying engine power to a reduction gear 23 through which power is applied to the fuel pump 24 and to the oxidizer pump 25. The fuel and oxidizer under pressure flow by way of conduits 94 and 95 to the rocket motor through the valves 96 and 97. The valves 96 and 97 are normally retained in closed position by means of a link 98 connected to the valve actuating arms 99 and 100, the spring 101 exerting a constant pull on the link to retain it in the valve "off" position. The valves are moved to open position by means of a solenoid 102 acting on one end of the link 98 to move the link in the direction of the arrow. The solenoid 102 is in series with a source of electric power and switches 103, 104 and 105. The latter switch responds to moderate pressure in the reaction chamber to close. The switches 103 and 104 are responsive to fuel and oxidizer pressures respectively to close and perform their part in closing the power circuit to the solenoid 102.

Connected between the fuel pressure line 76 and the line 106 is a pressure cut-off bypass 107 having a valve 108 therein. The valve 108 is normally retained in closed position by a spring 109 acting on the valve arm 110. The valve is moved to open position by the rod 111 extending into solenoid 112 and is adapted to be closed after a short time interval by a time delay mechanism incorporated in the valve. Valves having an automatic delayed closing action are commonly used in flushing toilets and such valves are readily adapted for use in the present apparatus. An example of such an automatic valve is the construction shown in Patent No. 1,624,130 granted to Thomas R. Beggs on April 12, 1927. Opening of the bypass valve for a brief time relieves the pressure in bellows 74 allowing the hot gas valve 16' to close immediately, due partly to gaseous pressure in the rocket chamber. Once the valve 16' becomes closed the pressure in the rocket chamber will maintain it closed even though there is pressure in the valve actuating bellows 74. The circuit to solenoid 112 includes a pressure switch 115 which responds to a higher pressure than that which acts on switch 105. Thus the bypass 107 can not open until oxidation is well started in the rocket chamber and there is no more need for hot gas flow through valve 16'. In the fuel pressure line 76 there is provided a throttle valve or metering valve 116 so that only enough fuel flow will reach the valve 16' to supply the fuel spray aperture 77 and also maintain sufficient pressure in the bellows 74 to hold the valve 16' open. Thus when the bypass 107 is opened the pressure in line 76 will be reduced for a short time interval to nearly zero without seriously affecting the fuel pressure in line 94 leading to the valve 96 and to the rocket motor. In order to actuate the clutch 22 to the driving condition thereof, a hydraulic actuating cylinder 120 is connected to the fluid pressure and return lines 121 and 122. In the cylinder 120 there is slidably mounted a piston 123 which carries a piston rod 124, the latter in turn being pivoted to a lever 125 mounted on a fixed pivot 126. The other end 127 of the lever 125 is adapted to force the clutch plates together and provide a driving connection from the engine shaft 8 to the gear reduction unit 23.

Attention is again directed to the hot gas valve 16' of the rocket motor. The fuel injection aperture 77 in the head of valve 16' allows flow of liquid fuel through the valve stem and valve head for cooling the valve and thus preventing serious oxidation of the metal wall thereof. Furthermore this fuel flow continues all the time the rocket motor is in operation, even after the valve 16' closes. This is because the throttle valve 116 will always permit limited fuel flow from the line 94 as long as the fuel pump is running and fuel remains in the fuel tank. The fuel issuing from the aperture 77 produces a central flame projected through the rocket reaction chamber to produce additional heat for primary ignition of the rocket reactants. This flame starts as soon as the valve 16' is opened, since the hot gas from combustion chamber 9 will ignite the fuel and will also carry sufficient excess air to support combustion of the fuel jet from aperture 77. Of course there is a brief interval of time when the bypass valve 108 is open during which the fuel pressure in the line 76 is reduced to allow closing of the valve 16' and during this interval of several seconds fuel flow through the aperture 77 subsides. It should be noted that the bellows 74 is sufficiently resilient to maintain the hot gas valve 16' closed at such times as the rocket motor is not in use.

As in the first form of control system operation of the rocket motor may be started by turning on the main control valve 130 to start the servo-fluid flowing in pressure line 121. The fluid will flow to cylinder 120 and thus actuate the servo-piston 123 to apply engine power to the fuel-oxidizer supply system. Since the pumps 24 and 25 will now start operating, the pressure switches 103 and 104 will close and fuel pressure will be applied to valve actuating bellows 74 to open the hot gas valve 16'. The flow of hot gas into the reaction chamber of rocket motor 14' and the propagation of primary ignition flame due to fuel flow from the aperture 77 will provide sufficient pressure to close the pressure switch 105 and thus complete the power circuit to solenoid 102 by way of switches 103 and 104. The fuel and oxidizer valves 96 and 97 will now open to feed additional liquid fuel and oxidizer to the rocket motor. The reaction chamber having been preheated and there being present the primary ignition flame, the reaction between the fuel and oxidizer will be started and once started will provide heat to maintain itself in operation. The increase in chamber pressure after starting the reaction between the rocket reactants will soon close the pressure switch 115, to complete a power circuit to the solenoid 112 and thus opening the bypass valve 108 for a brief time. The momentary reduction of fuel pressure on bellows 74 to nearly zero will cause the hot gas valve 16' to close, thus stopping further hot gas diversion through the pipe 15. The rocket propelling reaction will now continue in operation until the fuel and oxidizer are used up or until the operator shuts off servo-fluid valve 130. In case the valve 130 is closed, the clutch 22 will become disengaged and the pumps 24 and 25 will stop. The pressure switches 103 and 104 will now open and the solenoid 102 will be de-energized. The fuel and oxidizer valves 96 and 97 will be closed by spring 101. By stopping the flow of fuel and oxidizer to the reaction chamber, the pressure therein will return to zero and the pressure switches 105 and 115 will open. Thus all control elements are now in the original condition before operation of the rocket motor. It is noted that any fluid ahead of the piston 123 when the valve 130 is closed will be displaced by action of spring 123' and by leakage past the piston 123 this fluid will gradually escape to the fluid return line 122.

It is noted that the system of Fig. 3 includes pressure switches 105 and 115 to sense the flow of hot gas from the engine and the starting of the rocket propelling reaction respectively. However in accordance with the system of Fig. 2 these pressure-responsive switches may if desired be replaced by temperature-responsive switches. While the present description refers to only one particular combination of fuel and oxidizer it should be understood that the same apparatus will function as stated above with other rocket reactants, particularly those of the nonselfreacting kind. The main engine as illustrated is a typical turbojet type but as will be understood it may be any kind of engine using a combustion chamber and gas turbine.

In closing it is desired to outline some of the advantages and features of the present combination power plant. These are:

(1) Minimum of added weight by combining the rocket motor with a turbojet engine in the manner disclosed. Space requirements also are held to a minimum since the rocket motor occupies space in the engine which may normally not be used at all.

(2) Addition of the rocket motor entails the least number of added parts and auxiliaries, especially since power and hot gas is available from the engine. Even the gear reduction unit may be omitted in some cases, with the engine driving the pumps directly.

(3) Simplification of the fuel system for the rocket motor by use of the same fuel in engine and rocket motor, thus resulting in fewer tanks, conduits and valves as well as easier servicing of the power plant.

(4) Combined engine and rocket motor is more easily serviced and overhauled because the complete power plant is capable of being dismounted as a single unit.

(5) Coincidence of thrust axes of the engine and the rocket motor simplifies aircraft control because of absence of any turning moments due to spaced apart power units.

The embodiments of the invention herein shown and described are to be regarded as illustrative only and it is to be understood that the invention is susceptible of variations, modifications and changes within the scope of the appended claims.

I claim:

1. In a turbojet aircraft engine including in consecutive series an air compressor, a plurality of combustion chambers, a gas turbine and an exhaust section providing an annular exhaust passage coaxially located with respect to said engine, a rocket motor including an open-ended housing forming a reaction chamber, means mounting said housing centrally of said exhaust section and within the circular space inside of said annular exhaust passage, means for conducting limited volumes of hot exhaust gases from at least one of said compustion chambers to said reaction chamber, means for feeding rocket reactants to said reaction chamber to produce a flow of gaseous reaction products for discharge from the open end of said housing in the same direction as the exhaust gases flowing through and out of said annular exhaust passage from the engine, means for starting the flow of hot gases to said reaction chamber before the flow of rocket reactants thereto is started, and means responsive to initiation of the rocket reaction involving said reactants for stopping further flow of hot gases into said reaction chamber.

2. In a turbojet aircraft engine including in consecutive series an air compressor, a plurality of combustion chambers, a gas turbine and an exhaust section providing an annular exhaust passage coaxially located with respect to said engine, a rocket motor including an open-ended housing forming a reaction chamber, means mounting said housing centrally of said exhaust section and within the circular space inside of said annular exhaust passage, means for conducting limited volumes of hot exhaust gases from at least one of said combustion chambers to said reaction chamber, means for feeding rocket reactants to said reaction chamber to produce a flow of gaseous reaction products for discharge from the open end of said housing in the same direction as the exhaust gases flowing through and out of said annular exhaust passage from the engine, means for starting the flow of hot gases to said reaction chamber before the flow of rocket reactants thereto is started, means including a temperature responsive switch and a solenoid for stopping further flow of hot gases into said reaction chamber.

3. In a turbojet aircraft engine including in consecutive series an air compressor, a plurality of combustion chambers, a gas turbine and an exhaust section providing an annular exhaust passage coaxially located with respect to said engine, a rocket motor including an open-ended housing forming a reaction chamber, means mounting said housing centrally of said exhaust section and within the circular space inside of said annular exhaust passage, means providing a valve in the end of said housing opposite to said open end, means for conducting hot exhaust gases from at least one of said combustion chambers to said valve means, means including pumps driven by said turbine for feeding fuel and oxidizer in liquid forms to said reaction chamber to produce a flow of gaseous reaction products for discharge from the open end of said housing in the same direction as the exhaust gases flowing through and out of said annular exhaust passage from the engine, means to open said valve means at the same time said pumps are set in operation, and means including solenoid actuated valves to start the flow of fuel and oxidizer into said reaction chamber after the flow of hot air thereto has been started.

4. In a turbojet aircraft engine as recited in claim 3, and further including means responsive to initiation of the rocket reaction involving oxidation of said fuel for stopping further flow of hot gases into said reaction chamber.

5. In a turbojet aircraft engine including in consecutive series an air compressor, a plurality of combustion chambers, a gas turbine and an exhaust section providing an annular exhaust passage coaxially located with respect to said engine, a rocket motor including a housing of circular cross-section open at one end and forming a reaction chamber, means mounting said housing centrally of said exhaust section so as to substantially fill the circular space within said annular exhaust passage with the open end of said housing facing in the same direction as the discharge end of said annular exhaust passage, means for conducting limited volumes of hot exhaust gases from at least one of said combustion chambers directly to said reaction chamber, means for starting the flow of hot gases to said reaction chamber before the flow of rocket reactants thereto is started and means for feeding rocket reactants to said reaction chamber to produce a flow of gaseous reaction products for discharge from the open end of said housing in the same direction as the exhaust gases flowing through and out of said annular exhaust passage from the engine.

6. In a turbojet aircraft engine including in consecutive series an air compressor, a plurality of combustion chambers, a gas turbine and an exhaust section providing an annular exhaust passage coaxially located with respect to said engine, a rocket motor including a housing of circular cross-section open at one end and forming a reaction chamber, means mounting said housing centrally of said exhaust section so as to substantially fill the circular space within said annular exhaust passage with the open end of said housing facing in the same direction as the discharge end of said annular exhaust passage, means for conducting limited volumes of hot exhaust gases from at least one of said combustion chambers directly to said reaction chamber, means for starting the flow of hot gases to said reaction chamber before the flow of rocket reactants thereto is started and means including pumps driven by said gas turbine for feeding rocket reactants to said reaction chamber to produce a flow of gaseous reaction products for discharge from the open end of said housing in the same direction as the exhaust gases flowing through and out of said annular exhaust passage from the engine.

BRUNO W. BRUCKMANN.

References Cited in the file of this patent

UNITED STATES PATENTS

| Number | Name | Date |
|---|---|---|
| 2,382,564 | Haverstick | Aug. 14, 1945 |
| 2,404,335 | Whittle | July 16, 1946 |
| 2,419,866 | Wilson | Apr. 29, 1947 |
| 2,443,250 | Johnson | June 15, 1948 |
| 2,482,819 | Williams | Sept. 27, 1949 |
| 2,531,761 | Zucrow | Nov. 28, 1950 |

FOREIGN PATENTS

| Number | Country | Date |
|---|---|---|
| 919,127 | France | Nov. 18, 1946 |
| 936,183 | France | Feb. 16, 1948 |
| 594,207 | Great Britain | Nov. 5, 1947 |
| 246,173 | Switzerland | Sept. 1, 1947 |